United States Patent [19]

Sugasawa et al.

[11] Patent Number: 4,817,648
[45] Date of Patent: Apr. 4, 1989

[54] LENS CLEANER DEVICE FOR AUTOMOBILE HEADLAMP

[75] Inventors: Masatoshi Sugasawa; Shigeki Okuma, both of Shizuoka, Japan

[73] Assignee: Koito Manufacturing Co., Ltd., Tokyo, Japan

[21] Appl. No.: 811,219

[22] Filed: Dec. 20, 1985

[30] Foreign Application Priority Data

Dec. 28, 1984 [JP] Japan .............................. 59-276806
Sep. 30, 1985 [JP] Japan .............................. 60-216919

[51] Int. Cl.$^4$ .............................................. B08B 3/02
[52] U.S. Cl. .................................... 134/57 R; 134/95; 239/284.2
[58] Field of Search ................ 15/103, 250 R, 250 A, 15/250.13; 239/284.2; 134/94, 95, 97, 99, 198, 57 R

[56] References Cited

U.S. PATENT DOCUMENTS

| | | | |
|---|---|---|---|
| 3,058,142 | 10/1962 | Pollock | 15/250 A |
| 3,593,015 | 7/1971 | Marchant | 15/250 A |
| 3,656,691 | 4/1972 | Norstrand | 15/250 A |
| 3,877,104 | 4/1975 | Martin | 15/250 A |
| 3,902,217 | 9/1975 | Botz et al. | 15/250 A |
| 3,913,840 | 10/1975 | Kato | 134/199 |
| 3,963,969 | 6/1976 | Nottingham | 15/250 A |

FOREIGN PATENT DOCUMENTS

| | | | |
|---|---|---|---|
| 2005222 | 9/1971 | Fed. Rep. of Germany | 15/250 A |
| 2253675 | 5/1974 | Fed. Rep. of Germany | 239/284.2 |
| 2818582 | 11/1978 | Fed. Rep. of Germany | 239/284.2 |
| 2853924 | 7/1980 | Fed. Rep. of Germany | 15/250 A |
| 1396508 | 6/1975 | United Kingdom | 15/250 A |
| 1414405 | 11/1975 | United Kingdom | 239/284.2 |
| 1437697 | 6/1976 | United Kingdom | 239/284.2 |

Primary Examiner—Harvey C. Hornsby
Assistant Examiner—Frankie L. Stinson
Attorney, Agent, or Firm—Sughrue, Mion, Zinn, Macpeak & Seas

[57] ABSTRACT

An automatic cleaner device for automotive headlamps and the like which uses cleaning solution sparingly and hence which require only a small cleaning solution reservoir. For each cleaning operation, the fluid is jetted in two spurts. The first spurt penetrates and dissolves the dirty film on the lens, and the second spurt washes away the dissolved film.

22 Claims, 4 Drawing Sheets

LENS CLEANER DEVICE FOR AUTOMOBILE HEADLAMP

BACKGROUND OF THE INVENTION

The present invention relates to a cleaner device used to clean the lens of a headlamp on a motor vehicle.

The surfaces of lenses of automobile headlamps are easily soiled, and the intensity of the illumination provided by the headlamps can be greatly reduced due to films of dirt, mud or dust adhering thereto. Consequently, there has been proposed a cleaner device designed to remove such a film in which a spurt of a cleaning fluid such as water is jetted against the lens for a fixed interval of time. In such a device, typically, a spurt of water is supplied at a rate of about 120 cc/sec for about 0.65 second, i.e., about 78 cc of water in total is supplied.

In case dust and dirt remains after one washing using the conventional cleaner, washing must be repeated until the dust and dirt is sufficiently removed. Consequently, a large quantity of cleaning fluid, and hence a large cleaning fluid tank, are necessary. However, little space is available for installing a cleaning fluid tank under the hood of a modern automobile.

SUMMARY OF THE INVENTION

Solving the aforementioned problems, in a headlamp cleaner device according to the present invention, a first spurt of cleaning fluid is jetted against the surface of the lens of the headlamp, and after a certain delay period, a second spurt of cleaning fluid is jetted against the surface of the lens. The first spurt of cleaning fluid is allowed to soak in and soften the film of dirt, mud or dust during a fixed interval of time, and then the second spurt of cleaning fluid washes away the softened film.

DESCRIPTION OF THE PREFERRED EMBODIMENTS

Figure 1:
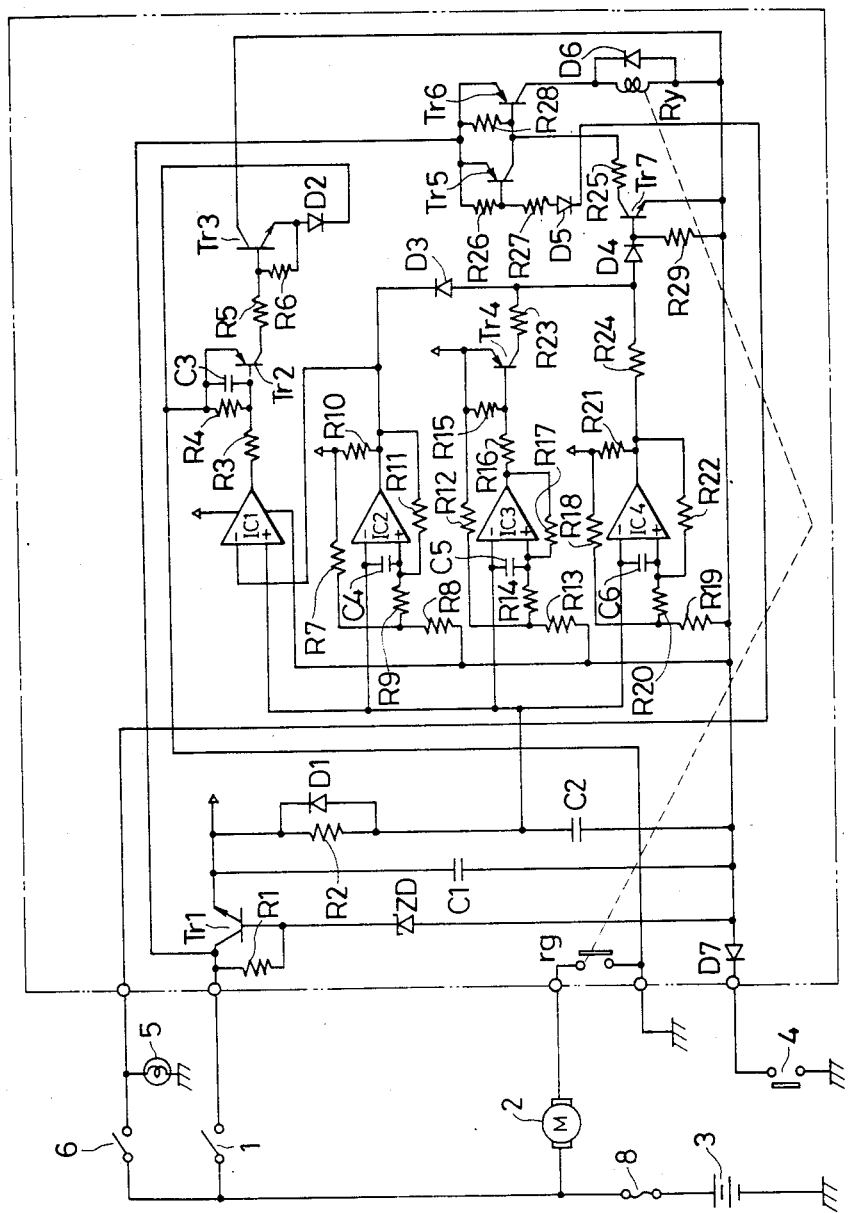
FIG. 1 is a circuit diagram of a cleaning device embodying the present invention.

FIG. 1 is a circuit diagram of a headlamp cleaning device embodying the present invention. In the circuit of FIG. 1, the device includes a headlamp 5, and ignition switch 1, a cleaner motor 2 used for jetting spurts of cleaning fluid against the headlamp 5, a battery 3, a cleaner switch 4, a lamp switch 6, a control circuit 7, and a fuse 8.

The control circuit 7 includes resistors R1 to R29, transistors Tr1 to Tr7, a Zener diode ZD, capacitors C1 to C6, diodes D1 to D7, comparators IC1 to IC4, and a relay RY. The resistors R18 to R22 and R24, the capacitor C6, and the comparator IC4 constitute a first timer, and the resistors R12 to R17 and R23, the capacitor C5, the resistors R7 to R11, the capacitor C4, and the comparator IC2 a third timer. The capacitor C1 is used to prevent the comparators IC1 to IC4 from oscillating, the capacitors C4 to C6 are employed to prevent the comparators IC2 to IC4 from oscillating, and the capacitor C3 is used to prevent the holding transistor Tr3 from turning on when the ignition switch 1 is in the RUN position. A constant-voltage circuit including the transistor Tr1 provides a stable voltage of about 5 volts from the nominal 8 to 16 volt battery supply.

Figure 2:
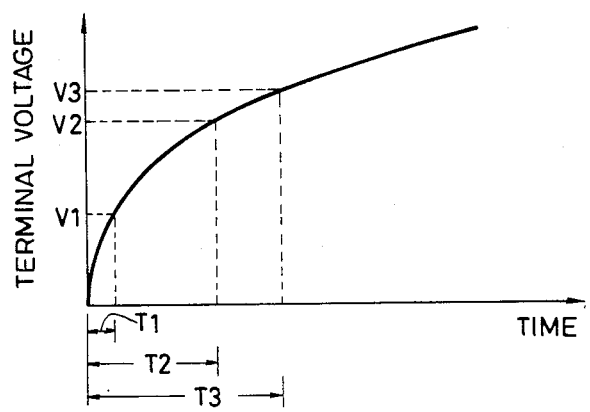
FIG. 2 is a graph illustrating capacitor charging characteristics.

The operation of the lens cleaner device thus constructed is as follows:

The ignition switch 1 and the lamp switch 6 are first assumed to be turned on. If the cleaner switch 4 is turned on in that state, the whole circuit will be grounded. When the circuit is grounded, the capacitor C2 is charged at a rate determined by the time constant defined by its own capacitance and the resistance R2. As the charging progresses, the terminal voltage of the capacitor C2 rises as shown in FIG. 2.

During the charging time of C2, the inverting and noninverting input terminal voltages of the comparators IC2 to IC4 are as follows: The inverting input terminal voltages are lower than the noninverting input terminal voltages when the charging is started. As the charging continues, in sequence, the inverting input terminal voltages of the comparators IC4, IC3 and IC2 become higher than their noninverting input terminal voltages when the terminal voltage of the capacitor C2 reaches reference voltages of V1, V2 and V3, respectively, determined by respective voltage-divider circuits.

Based on the above-described conditions, all of the comparators IC2 to IC4 output "1" level signals immediately after the capacitor C2 begins to charge. As the comparator IC1 consequently outputs a "0" level signal, the transistors Tr2 and Tr3 are turned on and, because the output of the comparator IC4 causes the transistors Tr7 and Tr6 to turn on, thus driving a relay RY, the cleaner starts operating.

When a fixed interval of time T1 has elaspsed after the start of charging, the inverting input terminal voltage of the comparator IC4 becomes higher than its noninverting input terminal voltage, and the comparator IC4 output level changes from "1" to "0". As a result, the transistors Tr7 and Tr6 are turned off and the relay RY is also turned off, whereby the cleaner stops operating. When a fixed interval of time T2 has elapsed after the start of charging, the inverting input terminal voltage of the comparator IC3 becomes higher than its noninverting input terminal voltage, and it thus produces a "0" level output signal. Consequently, the transistor Tr4 is turned on and a "1" level signal is supplied to the transistor Tr7 through the resistor R23 and the diode D4, whereupon the relay RY is again driven, whereby the cleaner restarts it cleaning operation. Although the comparator IC4 is then outputting a "0" level signal, the base potential of the transistor Tr7 will be maintained at a voltage sufficient to turn on the transistor Tr7 provided the resistance R24 is properly set.

When a fixed interval of time T3 has elapsed after the start of charging, as the charging progresses, the comparator IC2 output level changes from "1" to "0". Accordingly, the "1" level signal current, which was outputted through the resistor R23, is sunk by the comparator IC2 through the diode D3. The transistor Tr7 is consequently turned off, as is the transistor Tr6, and then the relay RY is also turned off, whereby the cleaner stops.

Figure 3:
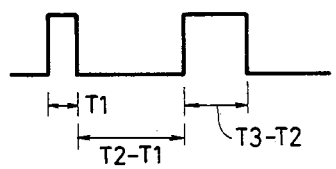
FIG. 3 is a chart illustrating times during which cleaning is carried out.

As shown in FIG. 3, cleaning is first carried out for an interval of time T1 of about 0.05 to 0.15 sec and stopped for an interval of time T2-T1 of about 0.2 to 2 sec. The dirty film on the face of the headlamp is sufficiently softened by the cleaning fluid jetted during the interval of T1 and then washed away during the subsequent interval of time T3-T2 of about 0.2 to 0.4 sec. The headlamp can thus be completely cleaned by water jetted at a rate of 120 cc/sec for a total of 0.55 sec (0.15+0.4 sec) at the most. Hence, it is seen that more than 12 cc of water can be saved for each cleaning operation.

The holding circuit will now be described. The holding circuit is used to make the cleaning operation continue even if the cleaner switch 4 is turned off after it has been held on for only a short interval. When the cleaner switch 4 is turned on, the comparator UC1 sends out a "0" level signal as aforementioned, and the transistors Tr2 and Tr3 are held on. The inverting input terminal of the comparator IC1 is kept at the "1" level after the cleaner switch 4 is turned on until the interval of time T3 has elapsed, and then the level is changed from "1" to "0". Once the cleaner switch 4 and the relay RY are turned on, the output of the comparator IC1 is held at the "0" level until the interval of time T3 has elapsed, and hence the activated/deactivated state of the relay RY is determined by the on/off state of the transistors Tr7 and Tr6. Thus, even if the cleaner switch 4 is released immediately after it is pressed, the grounded circuit of the relay RY will be held until the interval of time T3 has elapsed.

On the contrary, if the cleaner switch 4 is held on after the interval of time T3 has elapsed, the comparator UC1 output level will still change from "0" to "1" after the interval of time T3 has elapsed, as aforementioned. As the washer stops operating immediately after the interval of time T3 has elapsed, cleaning is also stopped. If the cleaner switch 4 is released in that state, the capacitor C2 will no longer be charged because the ground circuit is opened, and it is discharged through the diode D1 and the resistive component within the circuit. Moreover, if the cleaner switch 4 is opened before the interval of time has T3 elapsed, the transistor Tr3 will be turned off immediately after the interval of time T3 has elapsed, and the relay RY will also be turned off. As the ground circuit of the capacitor C2 is then released, the capacitor C2 also discharges.

The above-described operation applies to the case wherein the lamp switch 6 is on. When the switch 6 is off, the transistor Tr6 is also off because the transistor Tr5 is on. Power is accordingly not supplied to the relay RY and cleaning will not be carried out even if the cleaner switch 4 is pressed. Since cleaning can be carried out only while the lamp switch 6 is on, i.e., the headlamps are lit, the cleaning effect can be made more certain. That is, because no cleaning can be carried out while the headlamp are not lit, i.e., when the cleaning effect cannot be readily unconfirmed, cleaning fluid is prevented from being unnecessarily consumed.

The lamp 5 can be either a headlamp or a taillamp. It is also possible to drive the window washer interlockingly with the operation of the cleaner switch 4.

Figure 4:
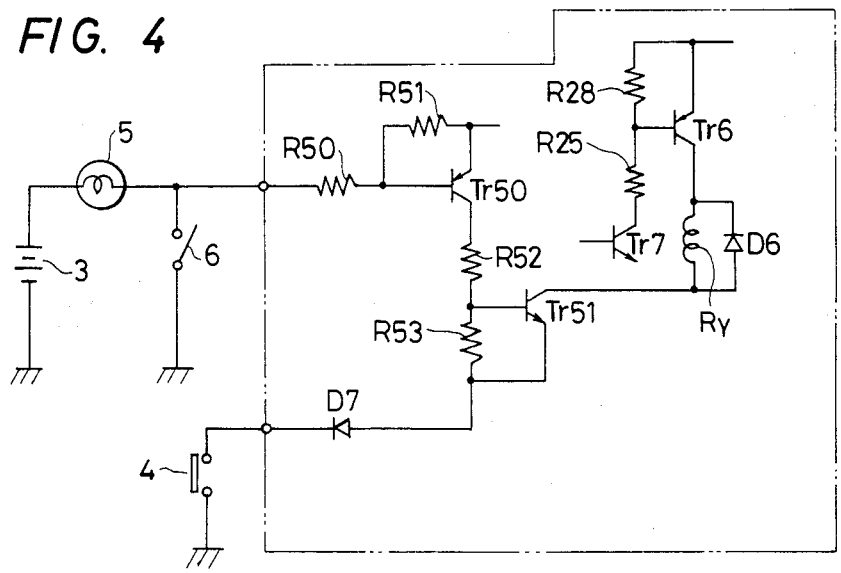
FIG. 4 is a circuit diagram showing another cleaning device embodying the present invention.

FIG. 4 illustrates an example wherein the lamp switch 6 has a grounded connection. In this circuit, because a transistor Tr50 is on when the lamp switch 6 is on, a transistors Tr7 and Tr6 are driven as in the case of FIG. 1. However, while the lamp switch 6 is off, the transistor Tr50 is off and, even if the cleaner switch is turned on, the transistor Tr51 cannot then be turned on, whereby cleaning cannot be carried out.

Figure 7:
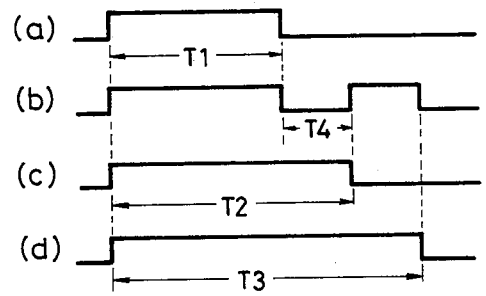
FIG. 7 is a waveform chart.

As shown in the timing chart of FIG. 7, the initial and following spurts of water can be set to have long and short durations, respectively, and the time duration of the two spurts and the interval therebetween can be adjusted as desired by making variable the reference voltage setting resistors R7, R8, R12, R13, R18 and R19 of the comparators.

Figure 5:
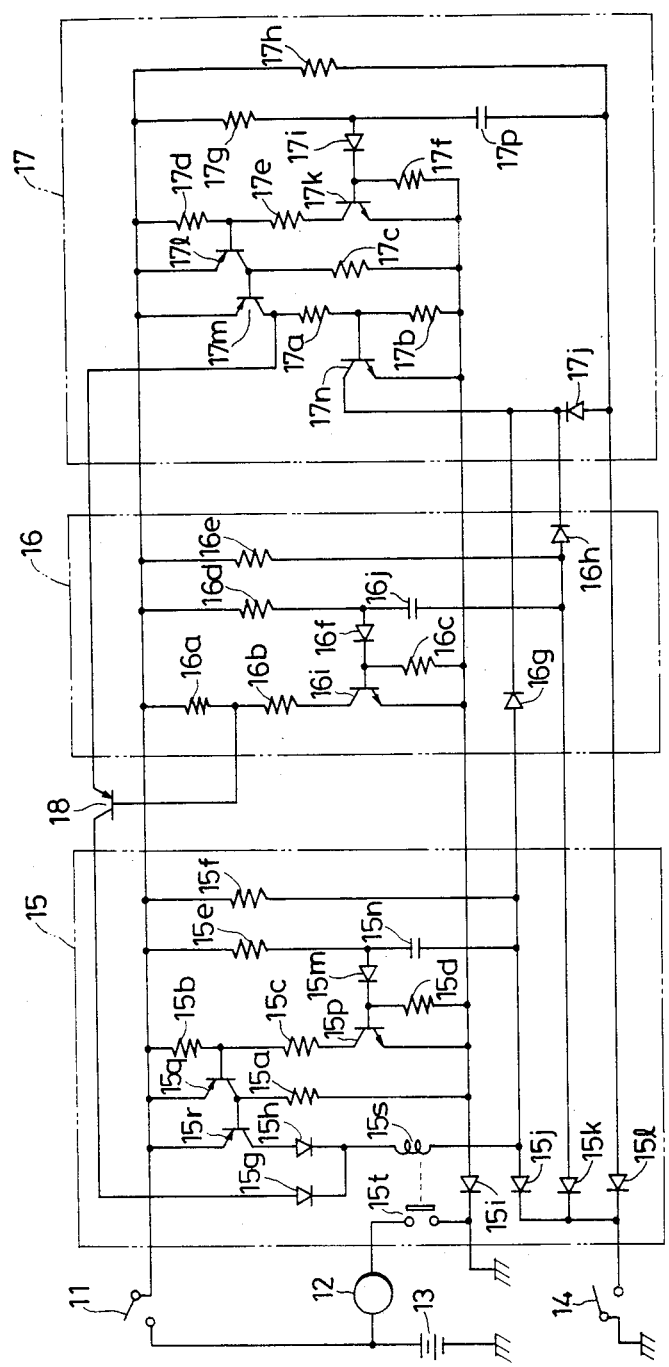
FIG. 5 is another circuit diagram showing still another cleaning device embodying the present invention.

FIG. 5 shows a circuit diagram of another cleaner device embodying the present invention. This circuit includes an ignition switch 11, a cleaner motor used to jet cleaning fluid against the lens of a headlamp, a battery 13, a cleaner switch 14, a first timer 15, a second timer 16, a third timer 17, and a transistor 18, the latter functioning as a fourth timer and producing an output signal only when either of the timers 16 and 17 generates an output signal. The operating time of the timer 16 is set longer than that of the timer 15, while the operating time of the timer 17 is made longer than that of the timer 16.

The timer 15 incorporates resistors 15a to 15f, diodes 15g to 15m, a capacitor 15n, the timer 16 includes resistors 16a to 16e, diodes 16f to 16h, a transistor 16i, and a capacitor 16j, and the timer 17 resistors 17a to 17h, diodes 17i to 17j, transistors 17k to 17n, and a capacitor 17p.

The operation of the cleaner device thus constructed is as follows:

The ignition switch 11 is first turned on to apply voltage to the base of the transistor 15p through the resistor 15e and the diode 15m. As the transistor 15p is thus turned on, the transistor 15p is turned on and the transistors 16i, 17k and 17l are successively turned on. On the other hand, because the capacitors 15n, 16j and 17p are charged through the resistors 15f, 16e and 17h, their terminals coupled to the resistor 15f, 16e and 17h, respectively, are positively charged.

Figure 6:
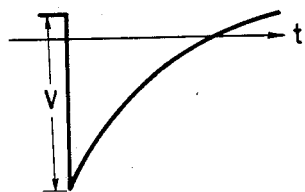
FIG. 6 is a graph illustrating changes in a capacitor charging voltage.

If the cleaner switch 14 is turned on to start a cleaning operation, one terminal of each of the capacitors 15n, 16j and 17p will be grounded through the diodes 15j to 15l. The bases of the transistors 15p, 16i and 17k will consequently be at negative voltages (reduced by the voltage drops across the diodes 15m, 16f and 17i, respectively) to which the capacitors 15n, 16j and 17p were charged, as shown in FIG. 6. For that reason, the transistors 15p, 16i and 17k are turned off, and consequently the transistor 15q is turned off and the transistor 15r is turned on, whereby the relay 15s is driven. The cleaner motor 12 is then driven because the contact 15t is closed, whereupon cleaning fluid is jetted. Moreover, because the transistor 17k is turned off, the transistors 17l is turned off and the transistors 17m and 17n are turned on. As the transistor 16i is held off, no voltage drop occurs across the resistor 16b, and the transistor 18 is turned off because no voltage is supplied across the base/emitter junction thereof.

As shown in FIG. 6, the base voltages of the transistors 15p, 16i and 17k, which have been held negative, rise as the capacitors 15n, 16j and 17p discharge and become positive after a certain interval of time. Since the operating time of the timer 15 is the shortest, the timer 15 terminates operation as shown in FIG. 7A after the interval of time T1 has elapsed. At that time, because the timers 16 and 17 continue to operate, the transistor 18 is still off and the relay 15s is released by the timer 15, as shown in FIG. 7B.

When the interval of time T2 has elapsed, the timer 16 also completes its operation, as shown in FIG. 7C. The transistor 16i is then turned on and a voltage drop occurs across the resistor 16a, which voltage, applied across the base and emitter of the transistor 18, turns on and drives the relay 15s again, as shown in FIG. 7B, so that cleaning fluid is jetted.

After a further elapse of time, the timer 17 complete its operation, as shown in FIG. 7D. The transistors 17k and 17l are then turned on and the transistor 17m is turned off, whereupon the supply of the current to the transistor 18 is stopped. The relay 15s is then deactivated, as shown in FIG. 7B.

As a result, cleaning fluid is jetted once as shown in FIG. 7B and then jetted once more after the interval of time T4 has elapsed. The cleaning fluid initially jetted is sufficient in quantity to penetrate the dirty film on the lens of the headlamp during the interval of time T4, thus softening the film. The film is then washed away by the cleaning fluid subsequently jetted after the interval of time T4.

Once the cleaner switch 14 is pressed, the transistor 17n operates to connect one end of each of the capacitors 15n, 16j and 17p to ground during the interval T3.

As set forth above, according to the present invention, a spurt of cleaning fluid is shot out again after a fixed interval of time has elapsed after a first spurt. Since the spurt of cleaning fluid first jetted is allowed to penetrate the dust and dirt and soften the film, the film can readily be washed away by the subsequent spurt of cleaning fluid. Thus, a large amount of cleaning fluid as heretofore required is unnecessary, and thus the cleaning fluid tank can be minimized in size. Due to this fact, the tank can be installed freely. Further, because of the improved cleaning efficiency, it is unnecessary to arrange the position of the headlamp or the like optimally relative to the cleaning nozzle, which results in increased freedom in installing the nozzle.

With respect to the above-described interval between jets of cleaning fluid, T1, T4 and T3-T2 are preferably about 0.20 to 0.40 sec, 0.2 to 2.0 sec and 0.05 to 0.18 sec, respectively. The initial, lengthier spurt fully dissolves the film and blows off dust and dirt sticking to the lens, and the second spurt, after a fixed interval of time, washes away the dissolved film, dirty water which remains on the lens.

We claim:

1. A lens cleaner device for automatically cleaning the lens of an automotive lamp, comprising:
   a supply of cleaning fluid;
   means for jetting said cleaning fluid against said lens in first and second spurts spaced a predetermined time apart from one another, wherein said jetting means comprises a plurality of comparators, means for supplying a first input of each of said comparators with a different reference voltage, and control means for controlling a flow of said cleaning fluid against said lens in response to outputs of said comparators; and
   means for initiating a lens cleaning operation, wherein said initiating means comprises a switching means for coupling a capacitor to said second inputs of each of said comparators, whereby outputs of said comparators change in sequence as a voltage across said capacitor changes.

2. A lens cleaner device for automatically cleaning the lens of an automotive lamp, comprising:
   a supply of cleaning fluid;
   means for initiating a lens cleaning operation; and
   means for jetting said cleaning fluid against said lens in response to actuating of said initiating means in first and second spurts spaced a predetermined time apart from one another,
   wherein said first spurt contains a sufficient amount of said cleaning fluid to penetrate and dissolve a film of dirt on said lens, and said second spurt contains a sufficient amount of said cleaning fluid to wash away and dissolved film; and
   wherein said means for jetting comprises a plurality of comparators for determining a duration of said first spurt, a length of time between said first and second spurts, and a duration of said second spurt, respectively.

3. The lens cleaner device of claim 2, wherein said predetermined period of time is sufficiently long to allows said first spurt to penetrate and dissolve said film.

4. The lens cleaner device of claim 2, wherein said first and second spurts are of different time durations.

5. The lens cleaner device of claim 4, wherein a duration of said first spurt is in a range of 0.05 to 0.15 sec and a duration of said second spurt is in a range of 0.2 to 0.4 sec.

6. The lens cleaner device of claim 4, wherein said duration of said first spurt is in a range of 0.20 to 0.40 sec. and a duration of said second spurt is in a range of 0.05 to 0.18 sec.

7. The lens cleaner device of claim 5 or 6, wherein a flow rate of said first and second spurts is approximately 120 cc/sec.

8. The lens cleaner device of claim 4, wherein a time between said first and second spurts is in a range of 0.2 to 2 sec.

9. The lens cleaner device of claim 2, wherein said initiating means comprises operator actuated switch means, and further comprising means for causing said jetting means to continue said first and second spurts if said operator actuated switch means is released prior to completion of said second spurt.

10. The lens cleaner device of claim 2, wherein said initiating means comprises operator actuated switch means, and further comprising means for causing said jetting means to stop operating after said second spurt has been completed even if said operator actuated switch means remains actuated at the completion of said second spurt.

11. The lens cleaner device of claim 2, wherein said initiating means comprises means for allowing operation of said cleaner device only when said lamp is lit.

12. A lens cleaner device for automatically cleaning the lens of an automotive lamp, comprising:
   a supply of cleaning fluid;
   means for initiating a lens cleaning operation; and
   means for jetting said cleaning fluid against said lens in response to actuating of said initiating means in first and second spurts spaced a predetermined time apart from one another,
   wherein said first spurt contains a sufficient amount of said cleaning fluid to penetrate and dissolve a film of dirt on said lens, and said second spurt contains a sufficient amount of said cleaning fluid to wash away and dissolved film; and
   wherein said first spurt contains a sufficient amount of said cleaning fluid to penetrate and dissolve a film of dirt on said lens, and said second spurt contains a sufficient amount of said cleaning fluid to wash away and dissolved film; and wherein said means for jetting comprises a plurality of comparators for determining a duration of said first spurt, a length of time between said first and second spurts, and a duration of said second spurt, respectively.

13. The cleaner device of claim 12, wherein said predetermined period of time is sufficiently long to allow said first spurt to blow off dust and dirt sticking to said lens.

14. The lens cleaner device of claim 12, wherein said first and second spurts are of different time durations.

15. The lens cleaner device of claim 14, wherein a duration of said first spurt is in a range of 0.05 to 0.15 sec. and a duration of said second spurt is in a range of 0.2 to 0.4 sec.

16. The lens cleaner device of claim 15, wherein a flow rate of said first and second spurts is approximately 120 cc/sec.

17. The lens cleaner device of claim 14, wherein said duration of said first spurt is in a range of 0.20 to 0.40 sec. and a duration of said second spurt is in a range of 0.05 to 0.18 sec.

18. The lens cleaner device of claim 14, wherein a time between said first and second spurts is in a range of 0.2 to 2 sec.

19. The lens cleaner device of claim 12, wherein said initiating means comprises operator actuated switch means, and further comprising means for causing said jetting means to continue said first and second spurts if said operator actuated switch means is released prior to completion of said second spurt.

20. The lens cleaner device of claim 12, wherein said initiating means comprises operator actuated switch means, and further comprising means for causing said jetting means to stop operating after said second spurt has been completed even if said opertor actuated switch means remains actuated at the completion of said second spurt.

21. The lens cleaner device of claim 12, wherein said initiating means comprises means for allowing operation of said cleaner device only when said lamp is lit.

22. A lens cleaner device for automatically cleaning the lens of an automotive lamp, comprising:
a supply of cleaning fluid;
means for initiating a lens cleaning operation, said means for initiating comprising:
a capacitor; and,
means for charging said capacitor;
means for jetting said cleaning fluid against said lens, said means for jetting comprising:
a plurality of comparators, each having a first input and a second input;
voltage divider means for supplying a different respective reference voltage to said first input of each of said comparators;
means for coupling said second input of each of said comparators to said capacitor;
whereby the outputs of said comparators change in sequence as a voltage across said capacitor changes; and
control means for controlling the flow of said cleaning fluid in response to the outputs of said comparators, such that said cleaning fluid is delivered to said lens in first and second spurts spaced a predetermined period of time apart from one another.

* * * * *